(12) United States Patent
Carlsson et al.

(10) Patent No.: US 7,724,768 B2
(45) Date of Patent: May 25, 2010

(54) POWER CONTROL FOR HIGH SPEED PACKET DATA TRANSMISSION

(75) Inventors: Roland Carlsson, Ojersjo (SE); Torbjorn Karlsson, Lindome (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 717 days.

(21) Appl. No.: 10/596,748

(22) PCT Filed: Oct. 5, 2004

(86) PCT No.: PCT/SE2004/001422

§ 371 (c)(1),
(2), (4) Date: Jun. 22, 2006

(87) PCT Pub. No.: WO2005/062490

PCT Pub. Date: Jul. 7, 2005

(65) Prior Publication Data

US 2007/0091853 A1    Apr. 26, 2007

(30) Foreign Application Priority Data

Dec. 22, 2003    (WO) .................. PCT/SE03/02053

(51) Int. Cl.
*H04J 3/16* (2006.01)

(52) U.S. Cl. ........................................... 370/465

(58) Field of Classification Search ......... 370/464–465; 455/522

See application file for complete search history.

(56) References Cited

U.S. PATENT DOCUMENTS

| | | | | |
|---|---|---|---|---|
| 7,283,508 | B2 * | 10/2007 | Choi et al. .................. | 370/341 |
| 2002/0173270 | A1 * | 11/2002 | Buer .......................... | 455/522 |
| 2003/0003941 | A1 * | 1/2003 | Goto et al. .................. | 455/522 |
| 2003/0125068 | A1 * | 7/2003 | Lee et al. .................... | 455/522 |
| 2004/0086137 | A1 * | 5/2004 | Yu et al. .................... | 381/71.11 |

(Continued)

FOREIGN PATENT DOCUMENTS

| | | | |
|---|---|---|---|
| EP | 1351411 A1 | 10/2003 | |
| WO | WO 03058988 A1 | 7/2003 | |

OTHER PUBLICATIONS

"Link and System Performance Aspects of Propotional Fair Scheduling in WCDMA/HSDPA", Vehicular Technology Conference, 2003 VTC 2003-Fall, IEEE 58$^{th}$ Orlando, FL Oct. 6-9, 2003, Piscataway, NJ, USA, IEEE, US, Conference Proceedings Article abstract.
Swedish Patent Office, International Search Report for PCT/SE2004/001422, dated Apr. 26, 2005.

*Primary Examiner*—Derrick W Ferris
*Assistant Examiner*—Omar Ghowrwal
(74) *Attorney, Agent, or Firm*—Roger S. Burleigh (57) ABSTRACT

Transmission unit comprising a first unit (CM_SCHDR) receiving scheduled first data (DATA2, DATA3) for transmission on at least a first channel, a power control unit (PWR_CTRL) for the first channel responsive to a respective closed loop power regulation signal (TCP_CMD), under which at least the transmit power rate of change is limited to a predetermined value per time unit, a packet data scheduler (HS_SCHDR) scheduling second data packets (DATA1), such as HSDPA data. A permitted power (P_PERM(t)) is defined as the maximum value of either the actual power of a previous instance (P_HS(t−1)) added with the predetermined value (d) or the determined possible power (P_POS(t)). Moreover, an available power is resolved. According to one aspect, the scheduling is performed within these limits. According to a further aspect the power level of the signaling and control channel (HS-SCCH) is further regulated during a transmission interval taking account of shared packet data channel (HS-PDSCH) power level.

3 Claims, 10 Drawing Sheets

U.S. PATENT DOCUMENTS

2004/0202104 A1* 10/2004 Ishii et al. .................. 370/225
2004/0203782 A1* 10/2004 Peng et al. ................. 455/436
2005/0043051 A1* 2/2005 Takano et al. ............... 455/522
2007/0111745 A1* 5/2007 Carlsson et al. ............ 455/522

* cited by examiner

POWER CONTROL FOR HIGH SPEED PACKET DATA TRANSMISSION

FIELD OF THE INVENTION

The present invention relates to power control in communications systems in particular in code division multiplex access (CDMA) systems such as UMTS systems (W-CDMA). More particularly, the present invention relates to aspects of high-speed packet downlink packet access communication (HSDPA).

BACKGROUND

As is well known, in wide band direct sequence CDMA systems signals consist of different pseudo-random binary sequences that modulate a carrier. Thereby, the spectrum of the signals is spread over a wide frequency range common to a number of channels in the system. Due to the direct sequence coding, orthogonality between signals is achieved, enabling individual decoding of signals from the common frequency range.

This coding principle has many advantages. For instance, direct sequence spread spectrum coding provides substantial reductions of the severity of multi-path fading, which leads to an effective utilization of spectrum resources.

Since signals occupy the same space in the frequency/time domain, an exact power regulation of the individual channels is an important aspect of CDMA systems.

CDMA systems employ power control on both the up- and the downlink. One objective of the power control is to regulate each mobile station transmitter operating within the cell site base-station receiver, such that the signals have the same power level at the base-station receiver regardless of the position or propagation loss of the respective mobile stations. It should be noted that the power level is proportional to the transmission data rate.

When all mobile station transmitters within a cell site are so controlled, then the total signal power at the base-station receiver is equal to the nominal received power times the number of mobile stations.

Each selected signal received at the base-station is converted into a signal that carries the narrowband digital information, whereas the other signals that are not selected constitute a wide band noise signal. However, the bandwidth reduction, which is performed according to the decoding process, increases the signal-to-noise ratio from a negative value to a level that allows operation with an acceptable bit error rate.

The overall system capacity, for instance the number of users that can operate within the cell simultaneously, depends on the minimum signal-to-noise ratio, which produces the given acceptable bit error rate.

On the downlink, the cell also supports power regulation by adjusting the downlink power for each signal to the respective mobiles in response to their requests. The purpose is to reduce power for units that are either stationary, relatively close to the cell site, impacted little by multi-path fading and shadowing effects, or experiencing little other cell interference. Thereby, the overall noise level diminishes and those mobiles being in a more difficult environment will benefit.

The current 3rd Generation Partnership Project (3GPP) specification for third generation mobile telephony system, also denoted UMTS (Universal Mobile Telephony System), supports different user data rates for different users. The transmitted downlink power for a given user entity is determined by the interference level in the actual cell, the prevalent channel quality, the user data rate, and the requested quality of service for the data transmission.

In UMTS systems there are two basic kinds of physical channels that are used for transmission: Dedicated channels and common channels. Only one user at a time may use a dedicated channel, whereas many users can share a common channel.

Normally, the downlink interference for a particular user entity stems from a plurality of transmissions of relatively low power to other user entities (on other orthogonal channels). The interference originates from adjacent base stations as well as the very base station—or base stations in case of soft handover—from which the user entity in question receives a transmission.

A transmit power control (TPC) loop is used for the dedicated channels. The purpose of the TPC loop is to regulate the downlink power for individual user entities so that the ratio between received power and the interference is held constant even though the absolute value of the interference fluctuates. Thereby, a desired user downlink data transmission quality can be obtained.

The TPC loop makes use of TPC commands that are forwarded from the user entity to the base station once per slot (1 slot corresponds to 0.67 ms). The TPC command may either 'raise the power' or 'lower the power' in steps. The power step adjustment for each command is normally 1 dB. This means that the TPC loop can adjust the transmission power 1 dB per slot at the most. Thereby, the power transmitted from the base station will vary over time due to variations in interference level from other sources and variations in channel quality. The utilization of the TPC loop will result in a relatively constant interference level for the individual user entity in question.

Recently, a new downlink service, High Speed Downlink Packet Access (HSDPA), has been introduced in 3GPP. A brief account of the operating principle can be found in "Performance Aspects of WCDMA Systems with High Speed Downlink Packet Access HSDPA)", by T. E. Kolding, et. al.

Figure 6:
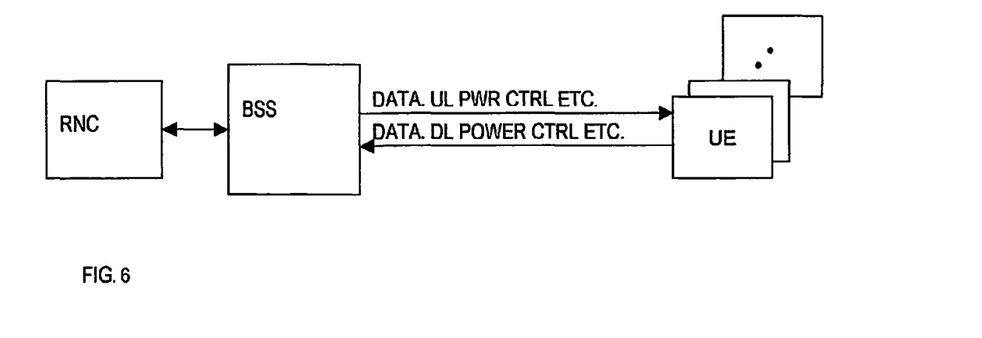

The HSDPA transmission makes use of a 2 ms transmission time interval (tti), corresponding to three time slots. The HSDPA transmission scheme moreover features adaptive modulation and coding (AMC) multimode transmissions, such as QPSK and 16 QAM modulations, fast physical layer (L1), and a hybrid automatic request (H-ARQ) mechanism. The scheduler is transferred from the radio network controller to the so-called Node B, also denoted base station set, BSS. In FIG. 6, an outline has been given, indicating the data transmissions, up-link power control and downlink power control to various user entities, UE's.

Figure 1:
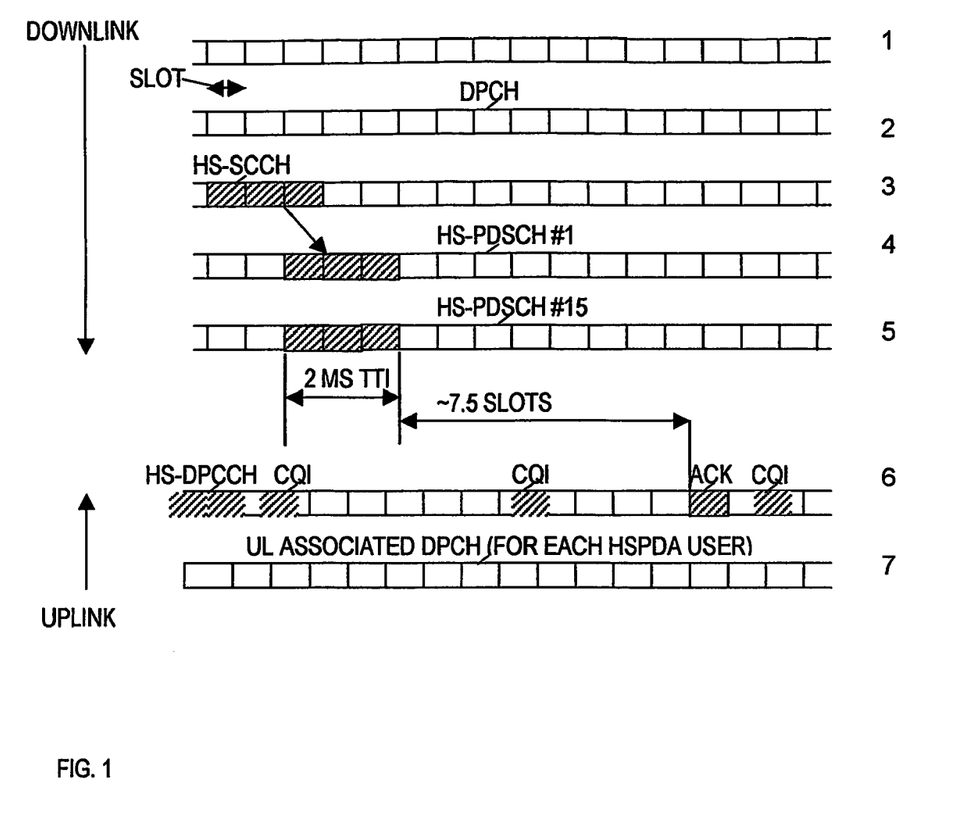
FIG. 1 shows the main channels utilized in HSDPA.

FIG. 1 shows the major channels utilized in HSDPA on the downlink:

- a number of dedicated channels, 1, for which resources are exclusively assigned to one given user at a time (i.e. circuit switched); the dedicated channels typically being devised for voice transmissions,
- a dedicated signal radio bearer, 2, for each user using HSDPA transmissions,
- a HSDPA Signaling and Control Channel (HS-SCCH) common channel for control signaling, 3,
- a number of HSDPA Packet Data Shared Channels (HS-PDSCH) common user data channels 4-5, on which HSDPA are allocated data in a flexible manner.

In a HSDPA system there may be provided 15 HS-PDSCH, 4-5, channels for one HS-SCCH channel, 3. Each of the 15 HS-PDSCH channels, 4-5, corresponds to an orthogonal CDMA code. For each transmission interval (tti) on the control and signaling channel, HS-SCCH, 3, the base station indicates to the prevalent given user entities that runs the HSDPA service, at which HS-PDSCH channels and in what way, downlink data are reserved for the given user entities in question. The base station allocates HSDPA packet data on the given packet data channels in the order and fashion as independently determined by the base station. Downlink packet data may for instance be arranged on all 15 channels on the same time slot for one and the same given user entity. Alternatively, data may be allocated on a fraction of the various available channels on a given transmission interval (tti), such that up to 4 user entities receive data on the same transmission interval. Data for a given user entity may be allocated to varying channels over time. If no data is prevalent, no data will be transmitted.

On the uplink side there is provided: a dedicated channel for, among other things, providing channel quality information, CQI, and HSDPA automatic repeat request signaling, H-ARQ, 6, an uplink dedicated channel associated with each HSDPA user comprising both control information and data, 7.

With the introduction of High Speed Downlink Packet Access (HSDPA) in UMTS systems, the interference level will no longer fluctuate in a slowly manner. Large momentary interference steps of several dB's will appear when the HSDPA channel turns from no data transmission to maximum data rate transmission. Other mobile stations will experience performance degradations around the time of initiation of the high power HSDPA transmission. This problem is often described as the 'flashlight effect problem'.

Figure 2:
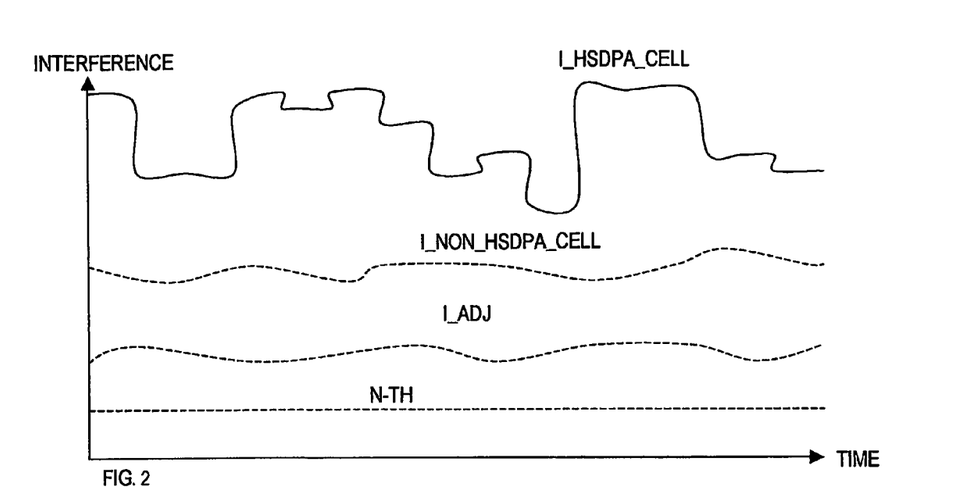
FIG. 2 shows an exemplary scenario for the downlink interference level for a user entity.

In FIG. 2, an exemplary scenario for the downlink interference level has been depicted for a typical user entity. The user entity experiences a certain level of thermal noise, N_TH. Also interference from downlink channels of adjacent cells, I_ADJ. Moreover, non-HSDPA inference from other downlink channels in the cell in which the given user entity resides, I_NON_HSDPA_CELL, also contributes to the interference level. The latter level is often of a considerable level, in relation to the two first mentioned sources. Finally, the interference from non-regulated HSDPA transmissions is shown, I_HSDPA_CELL. As mentioned above, these transmissions may be of a high magnitude and may change abruptly.

Figure 3:
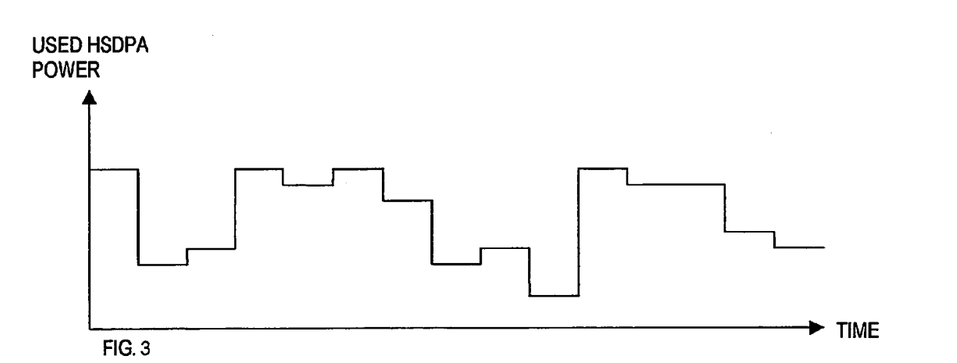
FIG. 3 shows the HSDPA transmission of FIG. 1 corresponding to the used HSDPA power, FIG. 4 discloses the interference contributions of FIG. 2 for an unregulated HSDPA transmission, FIG. 5 discloses an exemplary first embodiment of the transmission unit according to the invention.

In FIG. 3, the HSDPA transmission of FIG. 1 corresponding to the used HSDPA power in Node B has been further shown.

Figure 4:
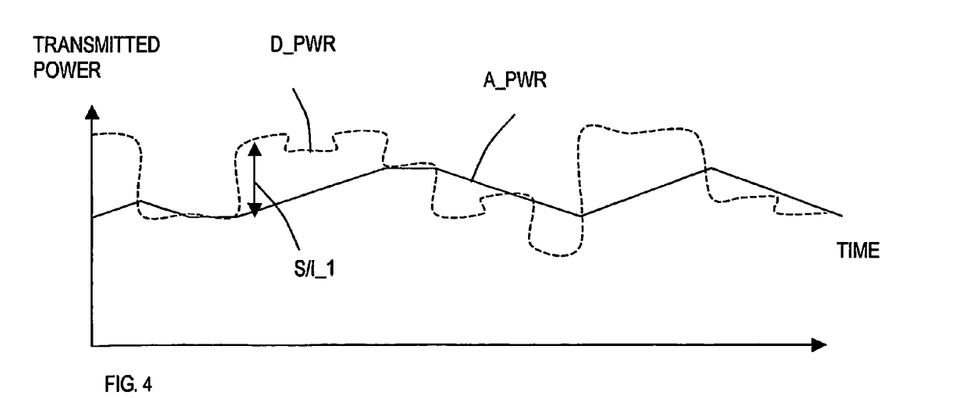

In FIG. 4, the sum, D_PWR, of the interference contributions of FIG. 2 has been depicted for an unregulated HSDPA transmission. The given actual dedicated channel power is denoted A_PWR. Since the TCP caters for a maximum change of 1 dB/0.67 ms, the prevalent signal to interference level, S/I_1, may decrease below the given minimum detection threshold on rising flanks of the HSDPA generated interference.

SUMMARY OF THE INVENTION

It is a first object of the invention to set forth a method for transmission unit for reducing interference effects in connection with transmissions on a control channel and a shared packet data channel.

It is a further object of the invention to avoid packet data transmissions interfering with at least a prioritized dedicated channel for which a transmit power loop regulation imposes restrictions, while optimizing packet throughput.

Further objects and advantages will appear from the following detailed description of the preferred embodiments of the invention.

BRIEF DESCRIPTION OF THE DRAWINGS

FIG. 6 shows a mobile communication system, FIG. 7 discloses a packet data scheduler according to a preferred first embodiment of the invention.

DETAILED DESCRIPTION OF A FIRST PREFERRED EMBODIMENT OF THE INVENTION

According to a first embodiment of the invention, a downlink CDMA channel used for HSDPA transmissions is subject to power control and scheduling with the aim of preventing flashlight effects.

As mentioned above, the downlink transmit power on dedicated non-HSDPA channels are regulated according to a closed loop (TPC) regulation depending on the reception conditions of the mobile station in question, according to which regulation at least the permitted transmit power rate of increase is limited to a predetermined first value per time unit. In CDMA systems, the terminals may request an increase or decrease in the downlink transmit power of 1 dB per time slot, that is, at a maximum rate of 1 dB/0.67 ms.

Depending on the actual system, another rate may pertain. High-speed packet data transmission has the property of not being restricted by TPC loop requirements.

HSDPA is a service where Node B (the base station) determines the amount of data to be transmitted as well as used transmission power. The amount of data to be transmitted is a function of available transmission power. There is a new HSDPA transmission every third slot (=2 ms).

The functions of Node B are: Air interface Transmission/Reception; Modulation/Demodulation; CDMA Physical Channel coding; Micro Diversity; Error Handing; Closed loop power control (TPC).

The functions of the RNC are: Radio Resource Control; Admission Control; Channel Allocation; Power Control Settings; Handover Control; Macro Diversity; Ciphering; Segmentation/Reassembly; Broadcast Signaling; Open Loop Power Control.

Figure 5:
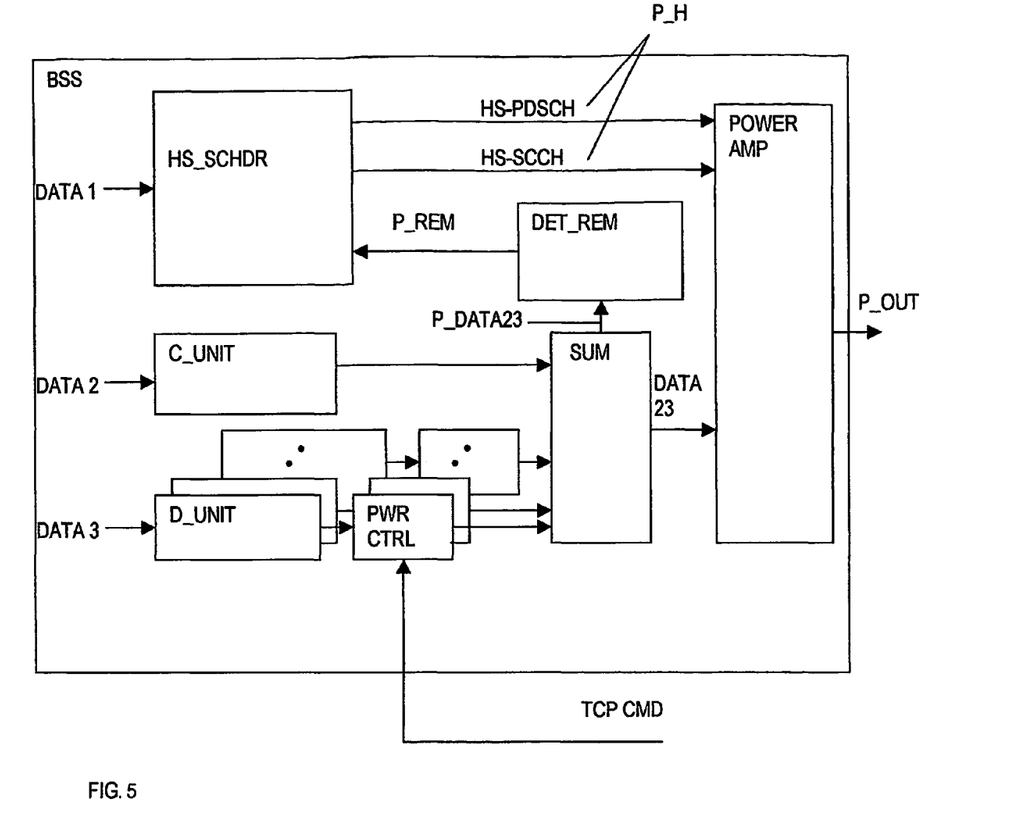

In FIG. 5, an exemplary embodiment of the transmission unit according to the invention is shown, BSS. The transmission unit comprises a number of dedicated channel units, D_UNIT, a number of corresponding power control units, PWR_CTRL, a summing stage, SUM, a common channel unit, C_UNIT. Common channel data, DATA2, cf. channel 1 in FIG. 1, and dedicated channel data, DATA3, cf., channel 2 in FIG. 1 are summed in summing stage SUM and output, DATA23 to power amplifier stage POWER_AMP at outlet P_OUT.

According to one embodiment of the invention, the respective common and dedicated units C_UNIT and D_UNIT, receive scheduled data, DATA2 and DATA3, respectively, which is scheduled by other standard units or nodes (not shown) and perform physical layer channel coding. The actual scheduling may alternatively be performed in the units C_UNIT and D_UNIT.

The respective power control unit, PWR_CTRL, for the respective dedicated channel is responsive to a respective closed loop power regulation signal, TCP_CMD, under which at least the transmit power rate of change is limited to a predetermined value per time unit.

The power amplifier, POWER AMP, amplifies and outputs the scheduled first and second data, whereby the outputted first and second channels are subject to interference from one another.

Each respective power control unit is responsive to respective closed loop power request commands (TCP_CMD) from the individual user entities.

The summing stage, SUM, reports a signal, P_DATA23, indicative of the power level of the outputted power of signal DATA23, which is provided to a remaining power determination stage, DET_REM.

Since the output power, P_OUT may be limited by a regulatory level or at least limited by physical restrictions of the power amplifier; there is a finite power level budget available for the total transmission, P_OUTMAX. Since the dedicated channels and the common channels, DATA2 and DATA3, have a higher priority, due to the their function of providing for voice and control signaling, a signal P_REM is defined as P_OUTMAX-P_DATA23, indicative of the remaining power being available after scheduling and power assignment of the common and dedicated channels. This signal is provided from remaining power determination stage DET_REM and delivered to HSDPA scheduler, HS_SCHDR.

The HSDPA scheduler encodes and schedules HSDPA data, DATA1, according to the routines provided by the invention, into channels HS_PDSCH and HS_SCCH, whose summed power level is denoted P_H.

Figure 7:
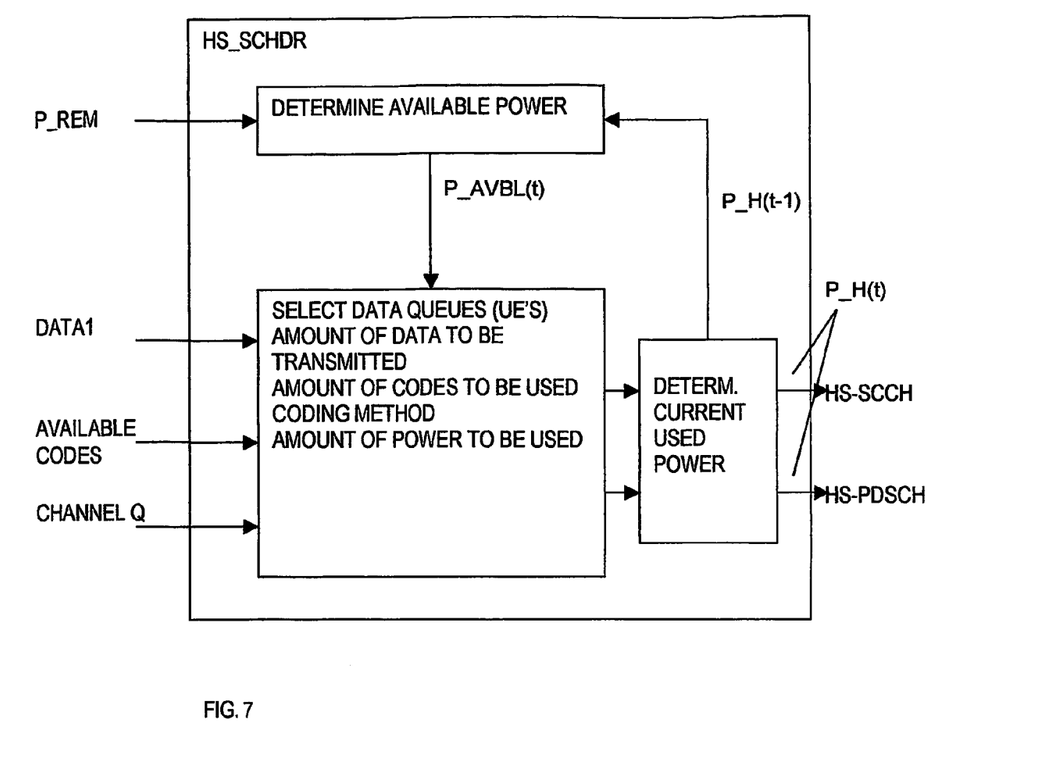

In FIG. 7, the HSDPA scheduler is represented. As mentioned above, the actual power level $P\_H(t)$, of a scheduling instance t relates to the issued power of the HSDPA transmission. The previous value of the actual power level $P\_H(t-1)$ is stored from a previous instance.

Moreover, an available power level, $P\_AVBL(t)$, is calculated by the scheduler.

According to the shown embodiment, the codes available for channel coding may be provided from an external source as well as the channel quality, Q.

Based on the amount of HSDPA data available at a given instance, DATA1, the available codes and the indicated quality level for the HSDPA transmission, the scheduler HS_S-CHDR determines the desired power for the HSDPA transmission at a given current scheduling instance.

The routines according to the invention for this determination shall be explained in more detail in the following, with reference to FIG. 8.

The transmission unit, BSS, for each scheduling interval of high-speed packet data operates the packet data scheduler, HS_SCHDR, to carry out the following steps:

1—for each scheduling interval,
2—the dedicated and common units receive scheduled first data, DATA2, DATA3, pertaining to the common and dedicated channels,
3—the transmission unit determines the remaining power $P\_REM(t)$, by means of the unit DET_REM,
4—a measure, denoted the possible power $P\_POS(t)$, is determined as the maximum value of either the actual power ($P\_HS(t-1)$) at a previous instance or the possible power determined at a previous instance ($P\_POS(t-1)$), decreasing the maximum value by a predetermined value (d); in other words $P\_POS(t):=MAX\ [P\_H(t-1), P\_POS(t-1)]-d$,
5—a measure, denoted the permitted power $P\_PERM(t)$, is determined at a given instance as the maximum value of either the actual power of a previous instance ($P\_HS(t-1)$) added with the predetermined value (d) or the determined possible power ($P\_POS(t)$); in other words $P\_PERM(t):=MAX\ [P\_H(t-1)+d, P\_POS(t)]$,
6—the available power $P\_AVBL(t))$ is determined as the minimum value of either the permitted power or the remaining power ($P\_REM(t)$); in other words $P\_AVBL(t):=MIN\ [P\_PERM(t), P\_REM(t)]$,
7—finally the scheduler schedules the high speed packet data in dependence of the prevalent amount of incoming high speed data according to the available codes and the channel quality in such a way that the output power $P\_H(t)$ is lower or equal to the determined available power $P\_AVBL(t)$.

If the HSDPA transmission has just been initiated the value of $P\_H(t-1)=0$ and $P\_POS(t-1)=0$. In UMTS systems the value d is selected to a value about 3 dB when the TPC step is set to 1 dB. Each scheduling instance has a duration of TTI=2 ms.

It is noted that the step of determining the remaining power can be done at any time before step 6.

According to the above embodiment of the invention, the power difference between two consecutive HSDPA transmissions is restricted in such a way that the used power for HSDPA channels is ramped up so slowly that the TPC loops for the dedicated channels can handle the power rise. By limiting the increment of used transmission power between two HSDPA transmissions, the interference increment will be limited. Thereby, the transmissions of the dedicated channels remain undisturbed. Moreover, the HSDPA power is regulated after a preceding HSDPA transmission in such a way that it benefits from the downward slope of the TPC restricted dedicated channels, thereby enhancing HSDPA throughput.

Figure 8:
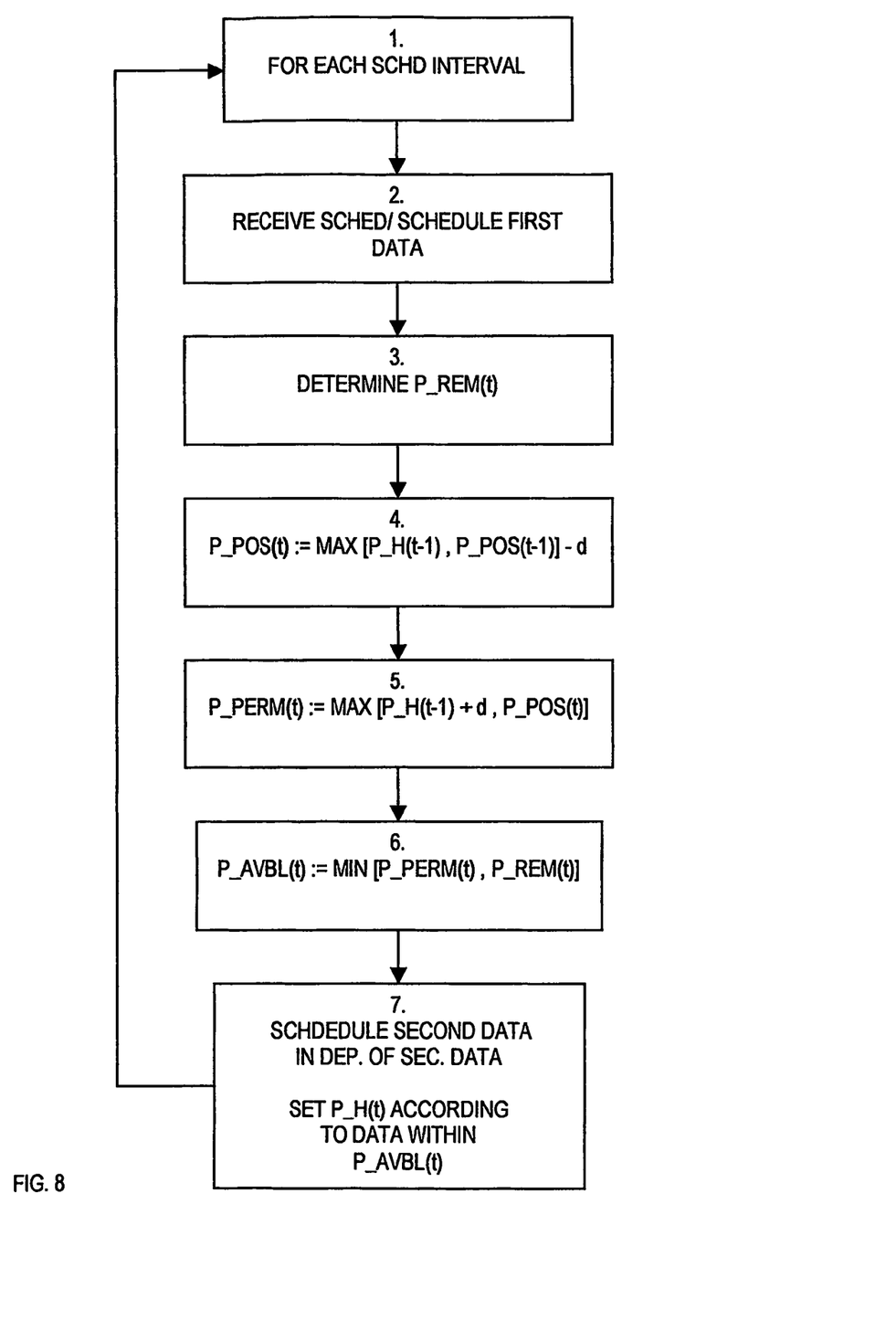
FIG. 8 shows a preferred routine according to the first embodiment of the invention.

According to a further embodiment of the invention, illustrated in FIG. 8, the transmission unit BSS for each scheduling interval of high speed packet data, DATA1, operates the high speed packet data scheduling according to steps 1-5 and regulates the actual power $P\_H(t)$ within the permitted power $P\_PERM(t)$ instead of the available power.

The functionality and the effects of the invention shall now be dealt with having reference to FIGS. 9-13, which relate to a given fictive exemplary scenario for incoming packet data, DATA1, utilizing the regulation as depicted in FIG. 8.

At scheduling instance t=A, it is imagined that the HSDPA packet data has been transmitted for some time at a fairly constant power level H(t) and that the dedicated channels are in balance with the HSDPA level as denoted by $P\_H(t)$.

Figure 9:
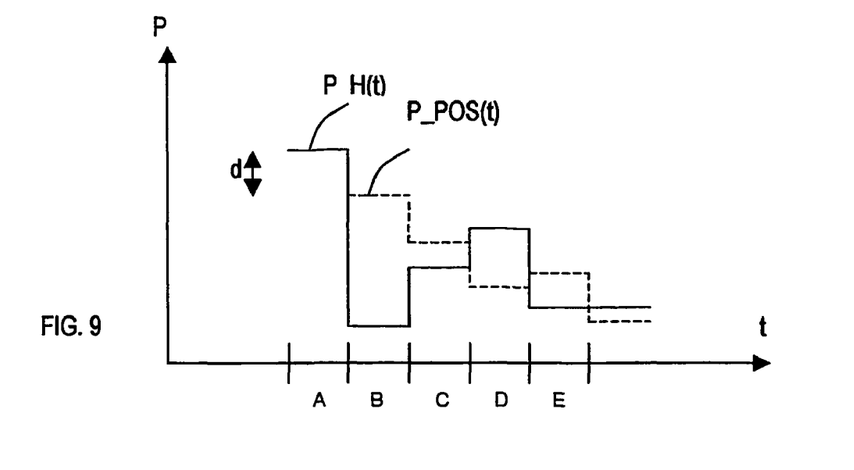
FIG. 9-13 show the functionality and the effects of the invention for a given exemplary scenario for incoming packet data.

In FIG. 9, the possible power $P\_POS(t)$ is calculated according to step 4.

Figure 10:
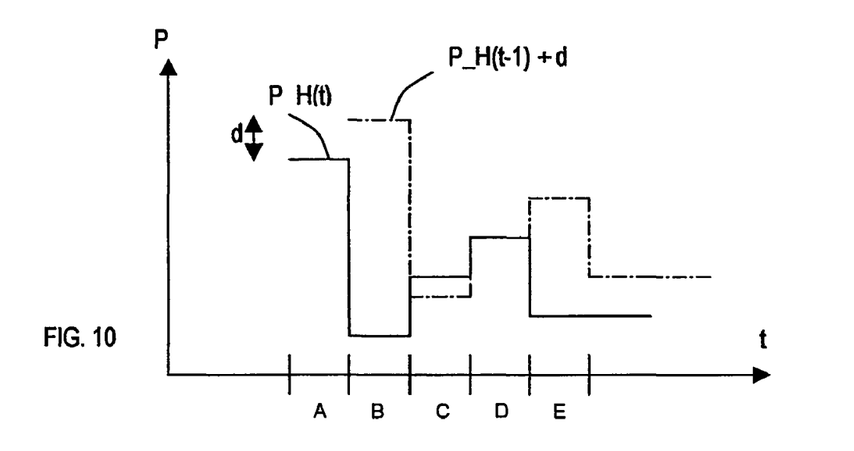

In FIG. 10, for reasons of illustration, the sum of the power level used in the preceding scheduling instance $P\_H(t-1)$ and the constant d has been shown.

Figure 11:
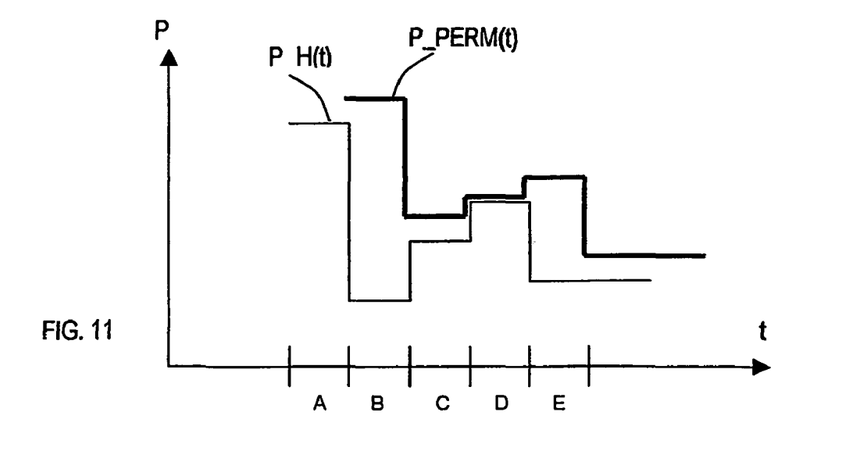

Hence, P_Perm as defined in step 5 can be graphically found by the maximum value of P_H(t−1)+d in FIG. 10 and P_POS(t) in FIG. 9. P_PERM(t) is depicted in FIG. 11.

Figure 12:
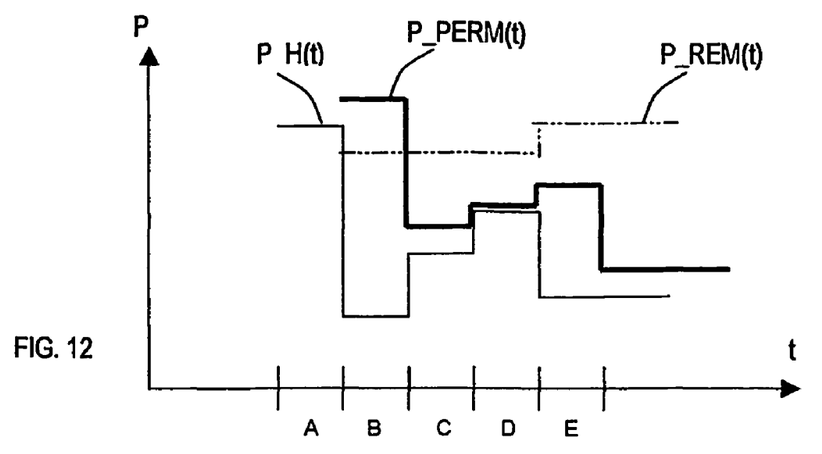
Figure 13:
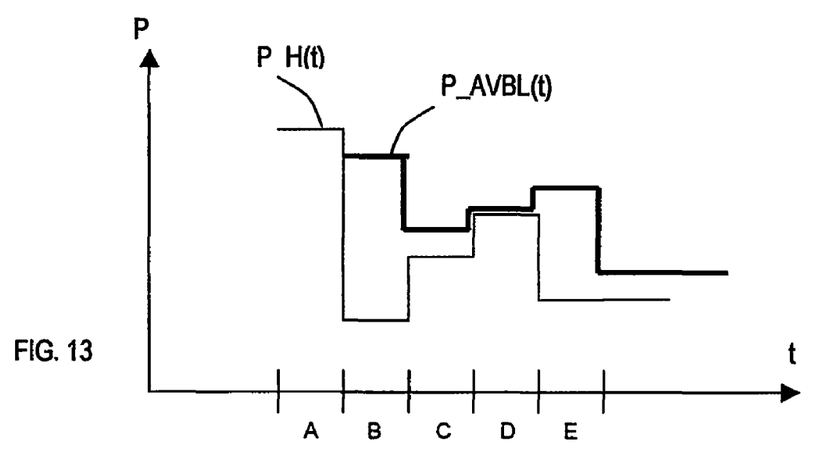

In FIG. 12, P_REM(t) and P_PERM(t) have been shown. FIG. 13 shows, P_AVBL(t) as defined in step 6.

For each scheduling interval, the scheduler schedules data at a power level lower or equal to the power level defined by P_AVBL(t), depending on whether enough HSDPA data is at hand.

Figure 14:
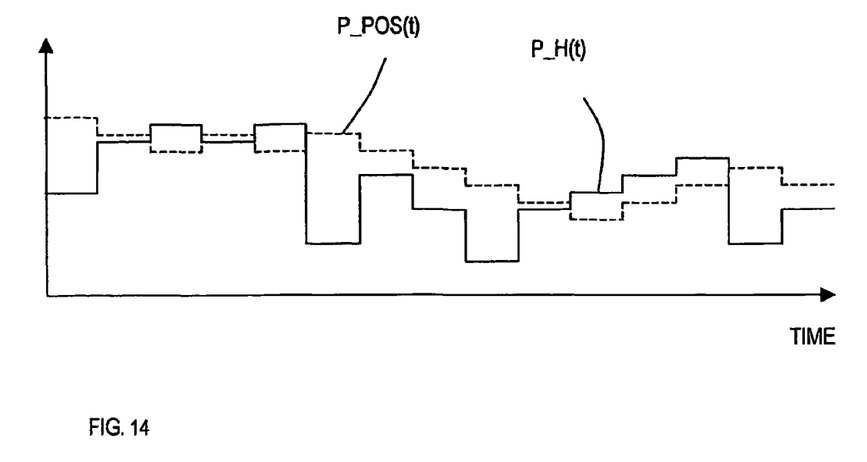
FIG. 14 shows another exemplary scenario and the effects of the invention for given in-put data.

In FIG. 14, another exemplary scenario has been shown for given input data in which the used HSDPA power P_H(t) and the possible power P_POS(t) are shown over time using the method described above.

As it appears, the measure P_POS caters for that the HSDPA transmission has such a low power build up-phase that the power loops of dedicated channels match the increase. It also indicates that a relative high level of HSDPA power is used after interruptions in HSDPA traffic.

Second Embodiment of the Invention

Figure 15:
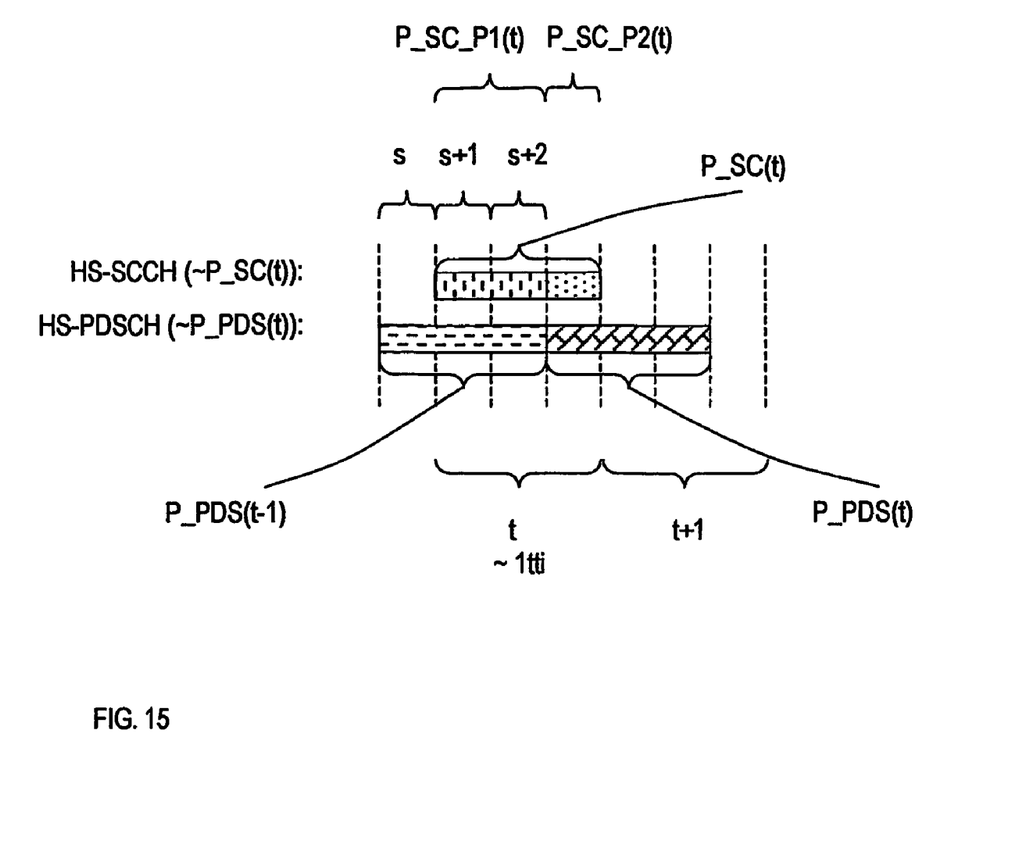
FIG. 15 shows details regarding transmission time intervals in HSDPA.

As mentioned above in connection with FIG. 1, the control data for a given transmission interval (t, tti) of the control channel (HS_SCCH) pertains to at least the allocation of data on the shared packet data channel (HS_PDSCH) for an associated transmission interval (t). The control data moreover comprises an indication of the actual coding method devised for each user entity in question. It is recollected that the shared packet data channel and the control channel operate on the same frequency spectrum, and it appears from FIG. 1 that the transmission interval of the control channel is overlapping the transmission interval of the shared packet data channel. It is seen that the transmission interval of the control channel is of the same duration as the transmission interval (t, tti) of the shared packet channels, but delayed two slots. Hence, as illustrated in FIG. 15, a first part of the control data is transmitted, while data may be transmitted on the shared packet data channel according to a previous transmission interval (t−1), and a second part of the control data is transmitted while packet data is to be transmitted on the shared packet data channel according to a present transmission interval (t).

If the associated HS-PDSCH signal is transmitted with high power, the second part of the HS-SCCH will be subject to interference compared to the first part. Moreover, if the HS-SCCH power is determined by the interference measured before the second part of the HS-SCCH transmission, the HS-PDSCH transmission will raise the interference during the second part, and the HS-SCCH message will not be correctly decoded in the user entity.

According to the second embodiment of the invention the power level of the signaling and control channel, HS-SCCH, is further regulated during a transmission interval in order to mitigate the above effects.

As mentioned in the background of the invention, a given sub-band has up to 15 active shared packet data channels (HS-PDSCH) that may be used in a highly flexible manner.

According to the invention, the accumulated power level of these individual active shared channels, P_PDSCH_i(t), at a given transmission interval (tti) is designated as follows i:

$$P\_PDS(t) = \sum_{i=1}^{15} P\_PDSCH\_i(t)$$

In the following, the power level of the control channel, HS-SCCH, is designated P_SC(t).

Figure 16:
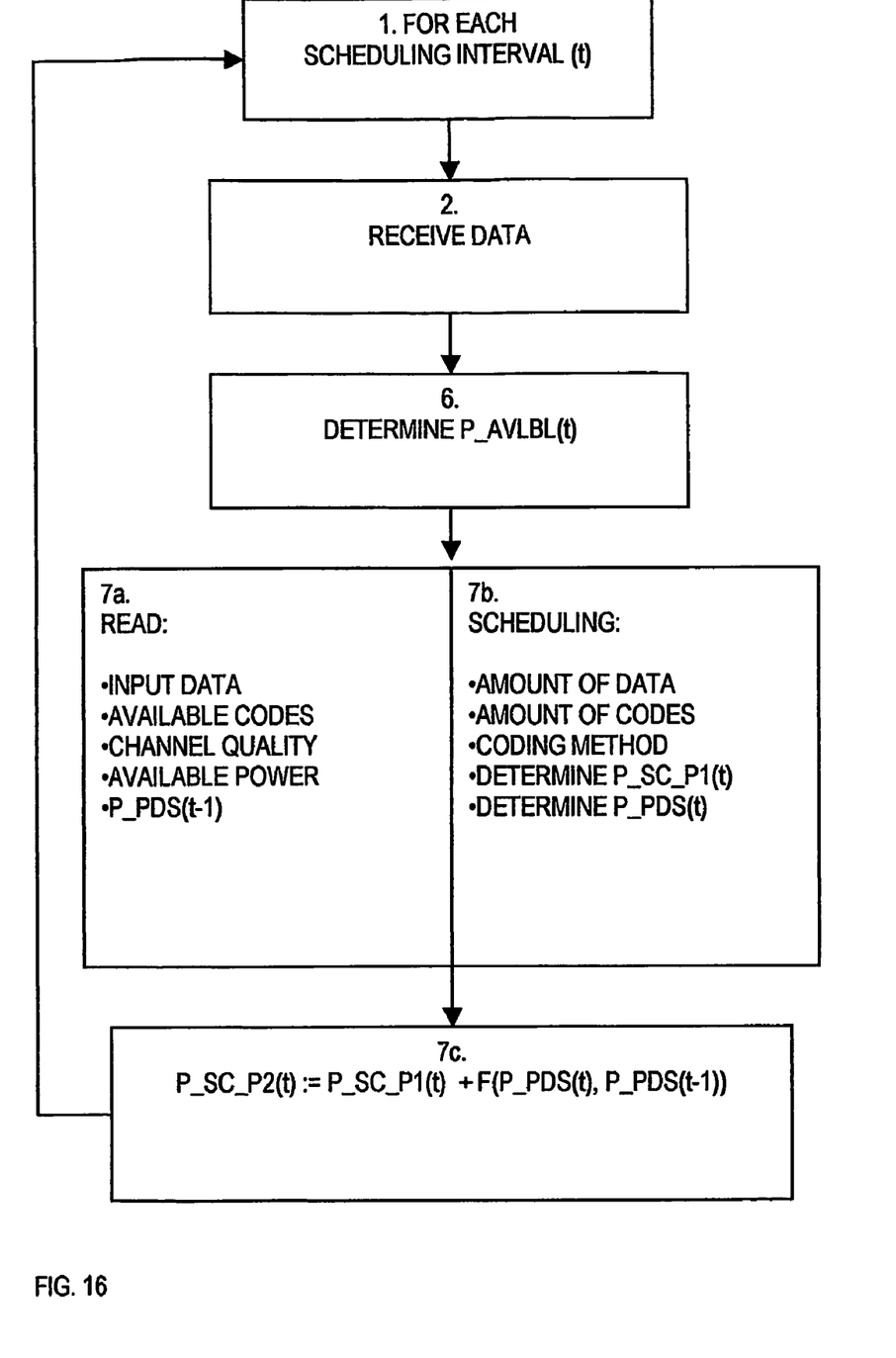
FIG. 16 shows a power regulation according to a second preferred embodiment of the invention.

According to the invention and as illustrated in FIG. 16, the transmission unit shown in FIG. 5 carries out the following routine:

1—for each scheduling interval, t
2—receiving downlink HSDPA data 1,
6—determining the available power (P_AVLBL(t)) for transmission on the control channel and the shared packet data channel;

It is noted that the available power may be determined according to steps 3-6 explained above in relation to FIG. 8, but that the available power may be determined in an alternative fashion. For instance the available power, P_AVBL, is set to a constant power level. Another alternative is to set the available power to the remaining power P_AVBL=P_REM.

7a—reading HSDPA input data 1, determining the available codes used for transmission, determining the channel quality, reading the available power, and the power level of the shared packet data (P_PDS(t−1) at a previous transmission interval, 7b—scheduling data for transmission, determining
  the amount of data,
  the amount of codes,
  the coding method,
  the power level of the shared packet data (P_PDS(t)) at the present transmission interval and
  the power level of the control channel (P_SC_P1(t)) for the first part of the present transmission interval, and
  based on the above findings, 7c—setting the power level of the second part (P_SC_P2(t)) as equal to the power level of the first part (P_SC_P1(t)) adjusted by a function (F) based on the power level of the shared packet data channel at the present transmission interval (P_PDS(t)) and the previous transmission interval (P_PDS(t−1).

More specifically, the power level of the second part may be determined according to the following relation:

ii: P_SC_P2(t):=P_SC_P1(t)+F(P_PDS(t), P_PDS(t−1))

Where the function F(a, b), may correspond to F(a, b)=K*(a−b), or another function based on this difference between P_PDS(t) and P_PDS(t−1), whereby the parameter K for instance may attain 1 or values between 1 and 0.

The invention claimed is:

1. A method, in a transmission unit, for transmitting packet data on at least one shared packet data channel and control data on a control channel, wherein control data for a given transmission interval (t) on the control channel pertains to at least the allocation of data for an associated transmission interval (t) on the shared packet data channel, wherein the transmission interval (t) of the control channel is overlapping the transmission interval (t) of the shared packet data channel, such that a first part of the control data of a present transmission interval of the control channel is transmitted while data may be transmitted on the shared packet data channel according to a previous transmission interval (t−1), and the second part of the control data of the present transmission interval of the control channel is transmitted while packet data is to be transmitted on the shared packet data channel according to the present transmission interval (t), the shared packet data channel and the control channel operating on the same frequency spectrum, the method comprising the steps of:
  determining the available power (P_AVLB(t)) for transmission on the control channel and the shared packet data channel;
  scheduling data for transmission, determining:
    the power level of the shared packet data (P_PDS(t−1)) at a previous transmission interval;

the power level of the shared packet data (P_PDS(t)) at the present transmission interval;

the power level of the control channel (P_SC_P1(t)) for the first part of the present transmission interval;

setting the power level of the second part of the control data of the present transmission interval of the control channel (P_SC_P2(t)) as the power level of the first part (P_SC_P1(t)) adjusted by a function (F) based on the power level of the shared packet data channel at the present transmission interval (P_PDS(t)) and the previous transmission interval (P_PDS(t−1)).

2. The method according to claim 1, wherein the function (F) corresponds to the difference between the power level of the shared packet data channel at the present transmission interval (P_PDS(t)) and the previous transmission interval (P_PDS(t−1)).

3. The method according to claim 2, wherein the power level of the second part of the control data of the present transmission interval of the control channel (P_SC_P2(t)) equals the sum of the power level of the first part of the control data of the present transmission interval of the control channel (P_SC_P1 (t)) and the function (F).

* * * * *

UNITED STATES PATENT AND TRADEMARK OFFICE
CERTIFICATE OF CORRECTION

PATENT NO. : 7,724,768 B2  Page 1 of 1
APPLICATION NO. : 10/596748
DATED : May 25, 2010
INVENTOR(S) : Carlsson et al.

It is certified that error appears in the above-identified patent and that said Letters Patent is hereby corrected as shown below:

On the Title Page, in Item (56), under "OTHER PUBLICATIONS", in Column 2, Line 1, delete "Propotional" and insert -- Proportional --, therefor.

On the Title Page, in Item (57), under "ABSTRACT" in Column 2, Line 11, delete "(P_HS(t-1))" and insert -- (P_H(t-1)) --, therefor.

In Column 6, Line 9, delete "(P_HS(t-1))" and insert -- (P_H(t-1)) --, therefor.

In Column 6, Line 16, delete "(P_HS(t-1))" and insert -- (P_H(t-1)) --, therefor.

In Column 6, Line 20, delete "P_AVBL(t))" and insert -- P_AVBL(t) --, therefor.

Signed and Sealed this

Nineteenth Day of October, 2010

David J. Kappos
*Director of the United States Patent and Trademark Office*